US011082294B2

(12) United States Patent
Magley et al.

(10) Patent No.: US 11,082,294 B2
(45) Date of Patent: Aug. 3, 2021

(54) BROADCAST REMOTE FIRMWARE UPDATE

(71) Applicant: Mueller International, LLC, Atlanta, GA (US)

(72) Inventors: Dale McLeod Magley, Norton, MA (US); David Edwin Splitz, Sandwich, MA (US); Gregory Caron, Assonet, MA (US); Brent Dukes, Raynham, MA (US)

(73) Assignee: Mueller international, LLC, Atlanta, GA (US)

( * ) Notice: Subject to any disclaimer, the term of this patent is extended or adjusted under 35 U.S.C. 154(b) by 470 days.

(21) Appl. No.: 15/677,138

(22) Filed: Aug. 15, 2017

(65) Prior Publication Data

US 2019/0058630 A1    Feb. 21, 2019

(51) Int. Cl.
*H04L 12/24*    (2006.01)
*H04W 52/02*    (2009.01)
(Continued)

(52) U.S. Cl.
CPC ............ *H04L 41/082* (2013.01); *G06F 8/654* (2018.02); *H04L 12/189* (2013.01); *H04L 12/1859* (2013.01); *H04L 12/1868* (2013.01); *H04L 43/10* (2013.01); *H04L 67/06* (2013.01); *H04L 67/34* (2013.01); *H04W 52/0219* (2013.01); *G06F 8/65* (2013.01); *H04L 67/146* (2013.01); *H04L 2012/445* (2013.01); *H04W 74/04* (2013.01)

(58) Field of Classification Search
CPC ............... H04L 41/082; H04L 12/1859; H04L 12/1868; H04L 12/189; H04L 43/10; H04L 67/06; H04L 67/34; H04L 67/146; H04L 2012/445; G06F 8/654; G06F 8/65; G06F 21/572; H04W 52/0219; H04W 74/04
USPC ........................................................ 709/221
See application file for complete search history.

(56) References Cited

U.S. PATENT DOCUMENTS 6,100,817 A    8/2000 Mason, Jr. et al.
10,560,968 B2    2/2020 Splitz et al.
(Continued)

FOREIGN PATENT DOCUMENTS

WO    2018231264    12/2018
WO    2019035852    2/2019

OTHER PUBLICATIONS

Splitz, David Edwin; Non-Final Office Action for U.S. Appl. No. 15/621,619, filed Jun. 13, 2017, dated Mar. 21, 2019, 23 pgs.
(Continued)

*Primary Examiner* — Tan Doan
(74) *Attorney, Agent, or Firm* — Taylor English Duma LLP

(57) ABSTRACT

A method of broadcasting firmware updating messages in a communication system includes the steps of receiving a broadcast remote firmware update (BRFU) setup message from an upstream source, the BRFU setup message specifying a number of transmissions of a broadcast of a firmware file; broadcasting setup information from the BRFU setup message on a first channel to downstream devices, the setup information specifying at least one other channel to which each downstream device should listen to receive a copy of the firmware file; and repeatedly broadcasting the firmware file to the downstream devices in accordance with the BRFU setup message.

23 Claims, 6 Drawing Sheets

(51) Int. Cl.
    *H04L 29/08*     (2006.01)
    *H04L 12/18*     (2006.01)
    *G06F 8/654*     (2018.01)
    *H04L 12/26*     (2006.01)
    *H04W 74/04*     (2009.01)
    *H04L 12/44*     (2006.01)
    *G06F 8/65*     (2018.01)

(56) References Cited

U.S. PATENT DOCUMENTS

| | | |
|---|---|---|
| 2003/0227934 A1 | 12/2003 | White et al. |
| 2005/0108288 A1* | 5/2005 | Hartshorne ............... G06F 8/65 |
| 2005/0201312 A1 | 9/2005 | Archacki, Jr. |
| 2006/0010437 A1* | 1/2006 | Marolia ................... G06F 8/65 |
| | | 717/168 |
| 2006/0274780 A1* | 12/2006 | Walsh .................... H04L 67/16 |
| | | 370/458 |
| 2007/0076739 A1 | 4/2007 | Manjeshwar et al. |
| 2008/0068994 A1 | 3/2008 | Garrison et al. |
| 2008/0163078 A1 | 7/2008 | Van Der Sanden et al. |
| 2008/0184341 A1 | 7/2008 | Sebesta |
| 2009/0112979 A1* | 4/2009 | Millican ................... G06F 8/70 |
| | | 709/203 |
| 2009/0180651 A1 | 7/2009 | Hilpisch |
| 2010/0054249 A1* | 3/2010 | Fernandez Gutierrez ................. |
| | | H04L 12/185 |
| | | 370/390 |
| 2010/0157889 A1 | 6/2010 | Aggarwal |
| 2011/0191764 A1* | 8/2011 | Piorecki .................... G06F 8/65 |
| | | 717/172 |
| 2013/0077552 A1 | 3/2013 | Lee |
| 2013/0195022 A1* | 8/2013 | Nguyen ................. H04B 1/713 |
| | | 370/329 |
| 2014/0013377 A1 | 1/2014 | Straub |
| 2014/0173579 A1 | 6/2014 | McDonald |
| 2014/0269521 A1 | 9/2014 | Economy |
| 2014/0282482 A1 | 9/2014 | Enns |
| 2015/0099555 A1 | 4/2015 | Krishnaswamy et al. |
| 2015/0173072 A1 | 6/2015 | Frederiksen |
| 2015/0223028 A1 | 8/2015 | Wang et al. |
| 2015/0373627 A1 | 12/2015 | Ryu et al. |
| 2016/0006837 A1 | 1/2016 | Reynolds |
| 2016/0277201 A1 | 9/2016 | Thubert et al. |
| 2017/0063566 A1* | 3/2017 | Seminario ........... H04L 12/2816 |
| 2017/0142639 A1 | 5/2017 | Meredith et al. |
| 2017/0230804 A1* | 8/2017 | Weidenfeller ........ H04L 12/189 |
| 2017/0251347 A1 | 8/2017 | Mehta et al. |
| 2018/0359778 A1 | 12/2018 | Splitz et al. |

OTHER PUBLICATIONS

Splitz, David Edwin; International Search Report and Written Opinion for PCT Application No. PCT/US17/50392; filed Sep. 7, 2017, dated Nov. 22, 2017, 9 pgs.

Magley, Dale McLeod; International Search Report and Written Opinion for PCT Application No. PCT/US17/50391; filed Sep. 7, 2017, dated Nov. 22, 2017, 10 pgs.

Splitz, David Edwin; Requirement for Restriction/Election for U.S. Appl. No. 15/621,619, filed Jun. 13, 2017, dated Nov. 1, 2018, 7 pgs.

Splitz, David Edwin; Corrected Notice of Allowance for U.S. Appl. No. 15/621,619, filed Jun. 13, 2017, dated Jan. 14, 2020, 6 pgs.

Splitz, David Edwin; International Preliminary Report on Patentability for PCT Application No. PCT/USI7/50392; filed Sep. 7, 2017, dated Dec. 17, 2019, 8 pgs.

Magley, Dale McLeod; International Preliminary Report on Patentability for PCT Application No. PCT/US17/50391, filed Sep. 7, 2017, dated Feb. 18, 2020, 9 pgs.

Splitz, David Edwin; Final Office Action for U.S. Appl. No. 15/621,619, filed Jun. 13, 2017, dated Sep. 16, 2019, 15 pgs.

Splitz, David Edwin; Notice of Allowance for U.S. Appl. No. 15/621,619, filed Jun. 13, 2017, dated Oct. 15, 2019, 10 pgs.

* cited by examiner

BROADCAST REMOTE FIRMWARE UPDATE

TECHNICAL FIELD

This disclosure relates to networks, and more specifically, to data communications between devices in a network.

BACKGROUND

A utility provider, such as a gas, electricity, or water provider, may have a large number of control, measuring, and sensing devices installed in the field in order to control transmission and distribution of the product, measure, and record product usage, and detect problems. Such devices may include water, gas, or electrical meters, remotely controlled valves, flow nodes, leak detection devices, and the like. Utility meters may include wireless communication capability to send and receive wireless communications with a remote communication device, enabling remote reading of meters. Advanced Metering Infrastructure (AMI), Automatic Meter Reading (AMR), and Advanced Metering Management (AMM) are systems that measure, collect, and analyze utility data using advanced metering devices such as water meters, gas meters, and electricity meters.

A typical network may include thousands of nodes. A "node" as used herein may refer to either a composite device in a network capable of performing a specific function or a communication module connected to such a device and configured to provide communications for the device. The network may also include a device known as a repeater, which receives a signal from a central network device, such as a hub, and that regenerates the signal for distribution to other network devices. The hub receives communications from a server. The server may originate the sending of a message to downstream devices in the network, either directly to each of those devices individually, or as a broadcast to the devices collectively. As used herein, "broadcast" includes sending a message that typically seeks to generate a response from more than one downstream device in a network, such as updating firmware. Broadcasting a single message to a plurality of downstream devices in the network (such as nodes) may save time and power compared with sending the identical message directly to each downstream device individually, which can take several hours or longer, depending on the number of downstream devices to be contacted.

SUMMARY

Disclosed is a method (and devices providing methods disclosed herein) of managing firmware update communications between devices in a communication system, comprising the steps of retrieving, at an upstream source, a firmware file from a file storage source; sending a broadcast remote firmware update (BRFU) setup message from the upstream source to at least one downstream device, the BRFU setup message specifying a wake time at which downstream devices targeted by the BRFU setup message should wake from a sleeping state to receive a copy of the firmware file, such devices comprising targeted downstream devices, and specifying a channel to which each targeted downstream device should tune after waking; and sending the copy of the firmware file from the upstream source to at least one transmitting device selected from a hub, a collector, and a repeater.

In another aspect of the current disclosure, a method (and at least one device providing such a method) of broadcasting firmware update messages in a communication system comprises the steps of receiving a broadcast remote firmware update (BRFU) setup message from an upstream source, the BRFU setup message specifying a number of transmissions of a broadcast of a firmware file, broadcasting setup information from the BRFU setup message on a first channel to downstream devices, the setup information specifying at least one other channel to which each downstream device should listen to receive a copy of the firmware file, and repeatedly broadcasting the firmware file to the downstream devices in accordance with the BRFU setup message.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

The present disclosure can be understood more readily by reference to the following detailed description, examples, drawing, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

Figure 1:
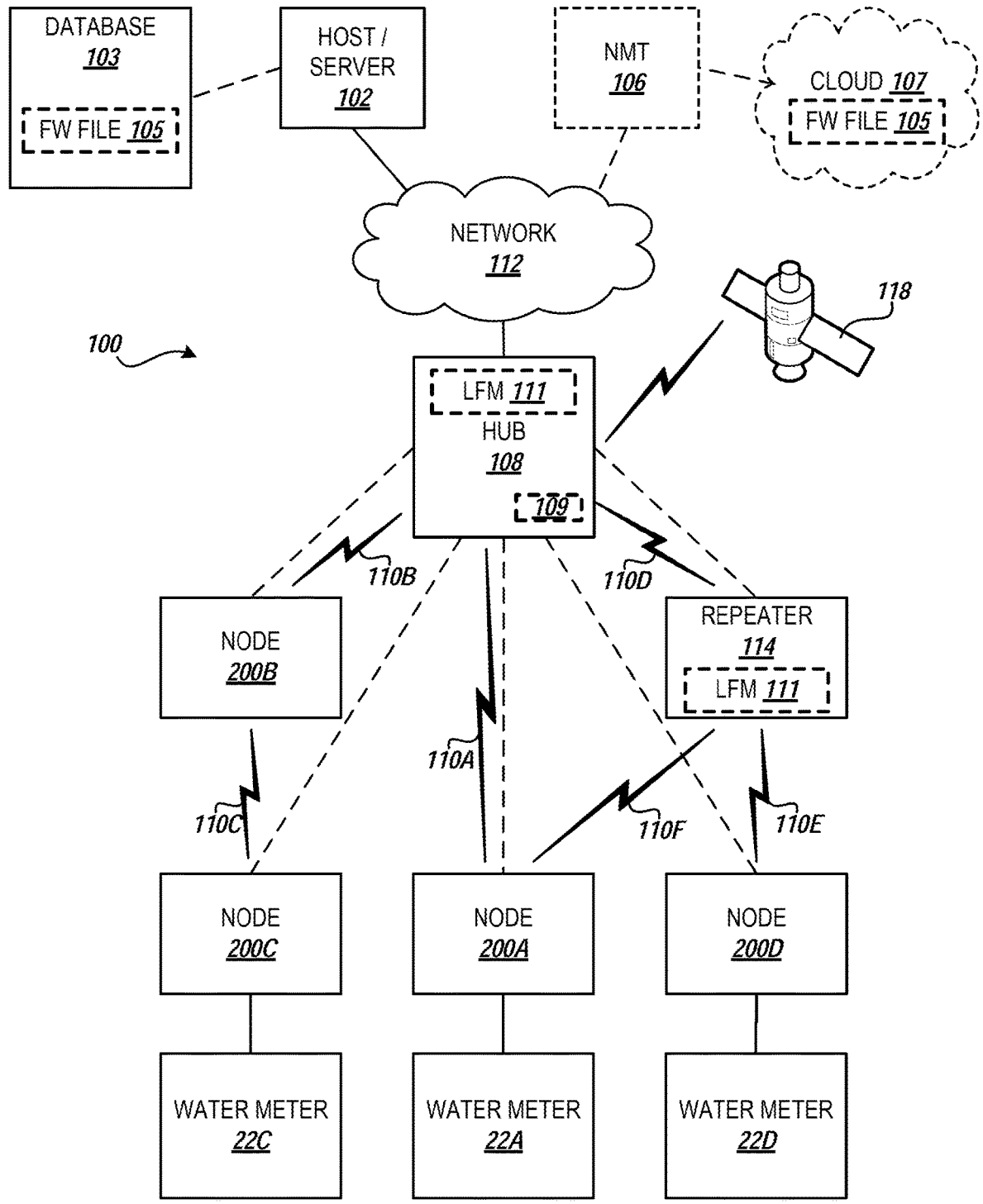
FIG. 1 is a block diagram showing one example of an AMI network topology, according to embodiments described herein.

FIG. 1 is a block diagram showing one example of a network topology of an illustrative fixed AMI system 100, such as that implemented by a utility provider. The present disclosure refers to several devices in an AMI system as either transmitting or receiving broadcast or direct messages, but the methods described in the present disclosure are not to be strictly limited to fixed AMI systems, as such methods can also be used in networks that include, among others, attributes of both AMI and AMR systems, such as those disclosed in U.S. patent application Ser. No. 15/161,448, filed May 23, 2016, now U.S. Pat. No. 10,097,411, which is hereby incorporated by reference in its entirety.

The AMI system 100 may include utility provider systems, such as host 102. The host 102 may represent a combination of application servers, database servers, communication servers, web servers, and the like that comprise the systems of the utility provider used to collect data from, control, and manage the various nodes 200A-200D (referred to herein generally as nodes 200) in the AMI system 100. For example, as shown in FIG. 1, nodes 200C, 200A, 200D may be respectively connected to water meters 22C, 22A, 22D and provide AMI network communications for the devices. For ease of reference, types of nodes other than hubs 108 (described below) will hereinafter be assigned the general reference numeral 200, unless stated otherwise, with the understanding that nodes 200 may have a construction according to the description of FIG. 2, to be described herein. The host 102 is shown being operatively connected to a database 103 that stores a firmware file 105, which is the file to be sent to other devices in system 100 when firmware updates of other system devices are conducted in the manner described herein.

According to various embodiments, the host 102 may communicate with downstream devices, including the nodes 200 through one or more collection hubs 108. As used herein, "downstream device" includes any device within the system 100, other than the host 102, that is configured to receive any communication originating from the host 102, including from any server comprising the host 102, in whole or in part. Stationary, or fixed, collection hubs 108 may comprise specialized network nodes installed in the field that act as a "parent node" for a set of assigned child nodes 200A-200D that communicate with the hub 108 through various communication links 110A-110E (referred to herein generally as communication links 110). The communication links 110 may include wireless communication links, such as RF communication links, among others. Owing to a stationary transceiver 109 housed in each hub 108, the communication across the communication links 110 is two-way. The collection hubs 108 may periodically collect usage data, node data, and other data from the child nodes 200 and forward data to the host 102 over a network 112. The collection hubs 108 may also forward messages received from the host 102 over the network 112 to the target child node(s) 200. The network 112 may comprise various networking technologies that connect the collection hubs 108 in the field to the host 102, including (among others) cellular data networks, Wi-Fi or WiMAX networks, satellite communication networks, metropolitan-area networks ("MANs"), wide-area networks ("WANs"), the Internet, and the like. In a downstream progression in which a node 200 is the ultimate recipient of a message, the message originates from an upstream source such as the host 102. The host 102 sends the originated message to a transmitting device, such as the hub 108 (FIG. 1) or, in some networks, to a collector. The hub 108 (or collector) then disseminates (broadcasts) the message to certain nodes 200 and, optionally, one or more repeaters 114 (FIG. 1), and from a repeater 114, the broadcast message is further disseminated to certain other nodes 200. A downstream device is "targeted" with filtering information present in one or more message fields within a broadcast message, as exemplified in U.S. patent application Ser. No. 15/621,619, filed Jun. 13, 2017, now U.S. Pat. No. 10,560,968, the disclosure of which is hereby specifically incorporated by reference herein in its entirety. In one implementation, when a targeted downstream device sends a response, the response is transmitted in an upstream progression, i.e., in the order of system devices opposite that recited for the aforementioned downstream direction.

As an alternative to the combination of the host 102 and database 103, as shown in FIG. 1, the firmware file 105 may be stored in a cloud 107, and a network management tool (NMT) 106 may be communicatively connected to the cloud 107 in order to access and retrieve a copy of the firmware file 105. The NMT 106 may be a computer application that is configured to communicate with clouds such as the cloud 107. The NMT 106 may be operatively connected to the network 112 in the same manner discussed above with regard to the host 102. As used herein, "upstream source" is intended to refer to either the host 102 or the NMT 106, whichever may be preferred to be used in a given system.

The collection hub 108 may communicate with its child nodes 200A-200D either directly or through one or more intermediary devices. For example, the AMI system 100 may include repeaters 114 that facilitate communication between the collection hub 108 and remote nodes, such as node 200D. According to further embodiments, some nodes may be configured to act as repeaters, referred to herein as "buddy nodes," such as node 200B shown in FIG. 1. It will be appreciated that some nodes in the AMI system 100, such as node 200A, may be located such that they receive messages from the collection hub 108 both directly and by way of one or more repeaters 114 or buddy nodes 200B.

The collection hub 108 and the repeater 114 are both shown including a long-range ("LoRa") frequency module (LFM) 111. The LFM 111 is a radio module mounted to a board that can be installed in the hub 108 and the repeater 114, and is intended to be compatible with radios inside nodes 200, including but not limited to LoRaWAN™ radio, and radios in node types sold by applicant under the names "MiNet.m" and "MiNode.m." In an AMR network, in which a collector (not shown) substitutes for hub 108, an LFM 111 could also be housed in the collector.

According to some embodiments, the collection hubs 108 may include or be connected to an accurate time source 118. For example, a collection hub 108 may be GPS-enabled and able to receive a highly accurate time value from a GPS receiver. Other accurate time sources 118 may include a cellular network connection, an integrated accurate real-time clock component, and the like. Because collection hubs 108 may be connected to fixed power sources, these devices may be able to maintain accurate current time without the need for reduced power consumption required by other, remote nodes 200. It will be appreciated that the configuration of the network comprising the AMI system shown in FIG. 1 and described above is merely one configuration, and additional devices and/or alternative configurations may be conceived by one skilled in the art. As such, the network topology shown in FIG. 1 and the network configurations described should not be seen as limiting but, instead, as merely exemplary.

The communication links shown in FIG. 1 represent a network or networks that may comprise hardware components and computers interconnected by communications channels that enable sharing of resources and information. The network may comprise one or more of a wired, wireless, fiber optic, or remote connection via a telecommunication link, an infrared link, a radio frequency link, a cellular link, a Bluetooth® link, or any other suitable connectors or systems that provide electronic communication. The network may comprise intermediate proxies, routers, switches, load balancers, and the like. The paths followed by the network between the devices as depicted in FIG. 1 represent the logical communication links between nodes (such as 200B and 200C), between a node 200 and the hub 108, or between nodes 200 and the repeater 114, not necessarily the physical paths or links between and among the devices.

Figure 2:
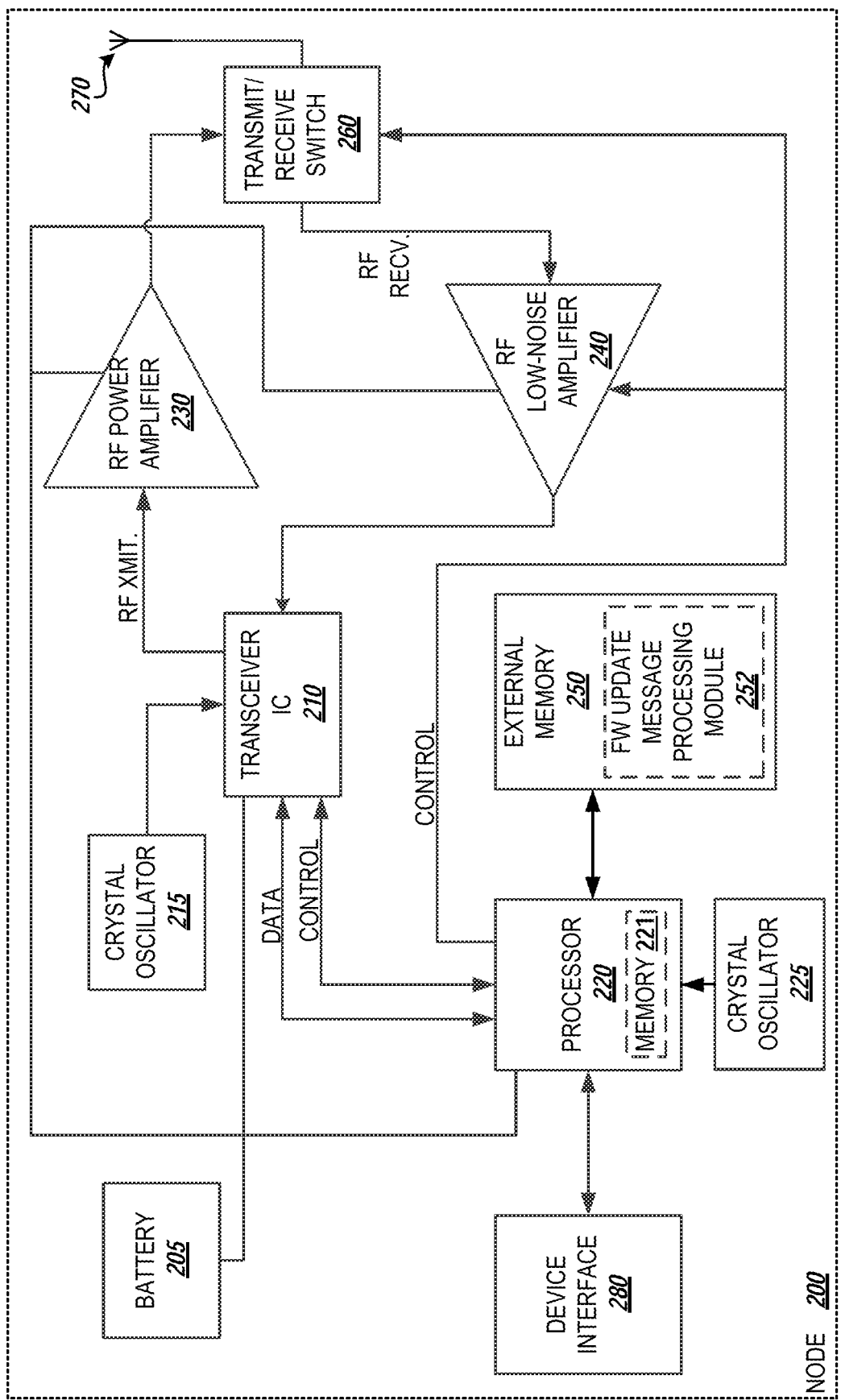
FIG. 2 is a block diagram of a node according to certain embodiments described herein.

FIG. 2 shows a block diagram of components of an illustrative node 200 configured for RF communication in AMR and AMI networks. In other words, the node 200 is able to operate in an AMI mode or in a modified AMR mode (the latter mode described in U.S. Pat. No. 10,097,411, incorporated by reference above). The node 200 may allow data to and from devices in the AMI system 100, such as water, gas, or electrical meters, remotely controlled valves, flow nodes, leak detection devices, collection hubs 108, repeaters 114, and the like, to be communicated over the wireless AMI network. For example the node 200 may be implemented in or connected to a water meter in order to transmit usage data as well as, in some implementations, audio recording data to the host 102 for leak detection. According to various embodiments, the node 200 may be configured for communication on various radio network topologies, including star, hybrid-star, peer-to-peer, and mesh, among others.

The node 200 may include at least one battery 205 that powers a transceiver integrated circuit ("IC") 210, a processor 220 having a built-in memory 221, an RF power amplifier 230, an RF low-noise amplifier 240, a memory 250, and other components. Memory 250 is an "external" memory in the sense that it is separate from, and not contained within, another node component, unlike built-in memory 221, for example. References to "external" memory herein are intended to refer to memory of the configuration illustrated in FIG. 2 at 250. Other embodiments include nodes with fewer elements, e.g., nodes without power amplifiers or low noise amplifiers, among others. Crystal oscillators 215 and 225 are connected to the transceiver IC 210 and the processor 220, respectively. The node 200 further includes a transmit/receive switch 260 and antenna 270. The processor 220 may be a microprocessor, a microcontroller, a field-programmable gate array ("FPGA"), or the like. The processor 220 and the transceiver IC 210 may include both a two-way data and a two-way control line. In some embodiments, the processor 220 includes a control line to each of the RF low-noise amplifier 240 and the transmit/receive switch 260. The processor 220 may also be connected to the memory 250 by a two-way data line.

The built-in memory 221 and external memory 250 may each comprise a processor-readable storage medium for storing processor-executable instructions, data structures and other information. The built-in memory 221 and external memory 250 may include a non-volatile memory, such as read-only memory ("ROM") and/or FLASH memory, and a random-access memory ("RAM"), such as dynamic random access memory ("DRAM") or synchronous dynamic random access memory ("SDRAM"). The built-in memory 221 and external memory 250 may store firmware that comprises commands and data necessary for the nodes 200, collection hubs 108, and repeaters 114 to communicate with other devices in the AMI system 100 as well as perform other operations of the nodes. According to some embodiments, the external memory 250 may store a firmware update message processing module 252 comprising processor-executable instructions that, when executed by the processor 220, perform at least portions of the method 600 for processing a firmware update message (FIG. 6), as described herein.

In addition to the memory 250, the node 200 may have access to other processor-readable media storing program modules, data structures, and other data described herein for accomplishing the described functions. It will be appreciated by those skilled in the art that processor-readable media can be any available media that may be accessed by the processor 220 or other computing system, including processor-readable storage media and communications media. Communications media includes transitory signals. Processor-readable storage media includes volatile and non-volatile, removable and non-removable storage media implemented in any method or technology for the non-transitory storage of information. For example, processor-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

According to embodiments, the processor 220 may be further connected to other components of the node 200 through a device interface 280. In some embodiments, the device interface 280 may connect to a metering component, such as a water meter (exemplified in FIG. 1 at 22C, 22A, and 22D), a gas meter, or an electricity meter, that allows the meter to provide usage data to the host 102 through the AMI system 100. In further embodiments, the device interface 280 may connect to nodes or detection components, such as a leak detection device. In still further embodiments, the device interface 280 may connect to a control component, such as an electronically actuated water valve, that allows the host 102 and/or other devices in the AMI system 100 to control aspects of the utility provider's infrastructure. These examples are not meant to be limiting, and those of skill in the art will recognize that alternative device components that may be interfaced with the node 200 through the device interface 280. For example, the device interface 280 may connect to a control component (valve actuator) and a data reading port (water meter readings) at the same time.

It will be appreciated that the structure and/or functionality of the node 200 may be different than that illustrated in FIG. 2 and described herein. For example, the transceiver IC 210, processor 220, RF power amplifier 230, RF low-noise amplifier 240, memory 250, crystal oscillators 215, 225, device interface 280 and other components and circuitry of the node 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the node 200 may not include all of the components shown in FIG. 2, may include other components that are not explicitly shown in FIG. 2 or may utilize an architecture completely different than that shown in FIG. 2.

Figure 3:
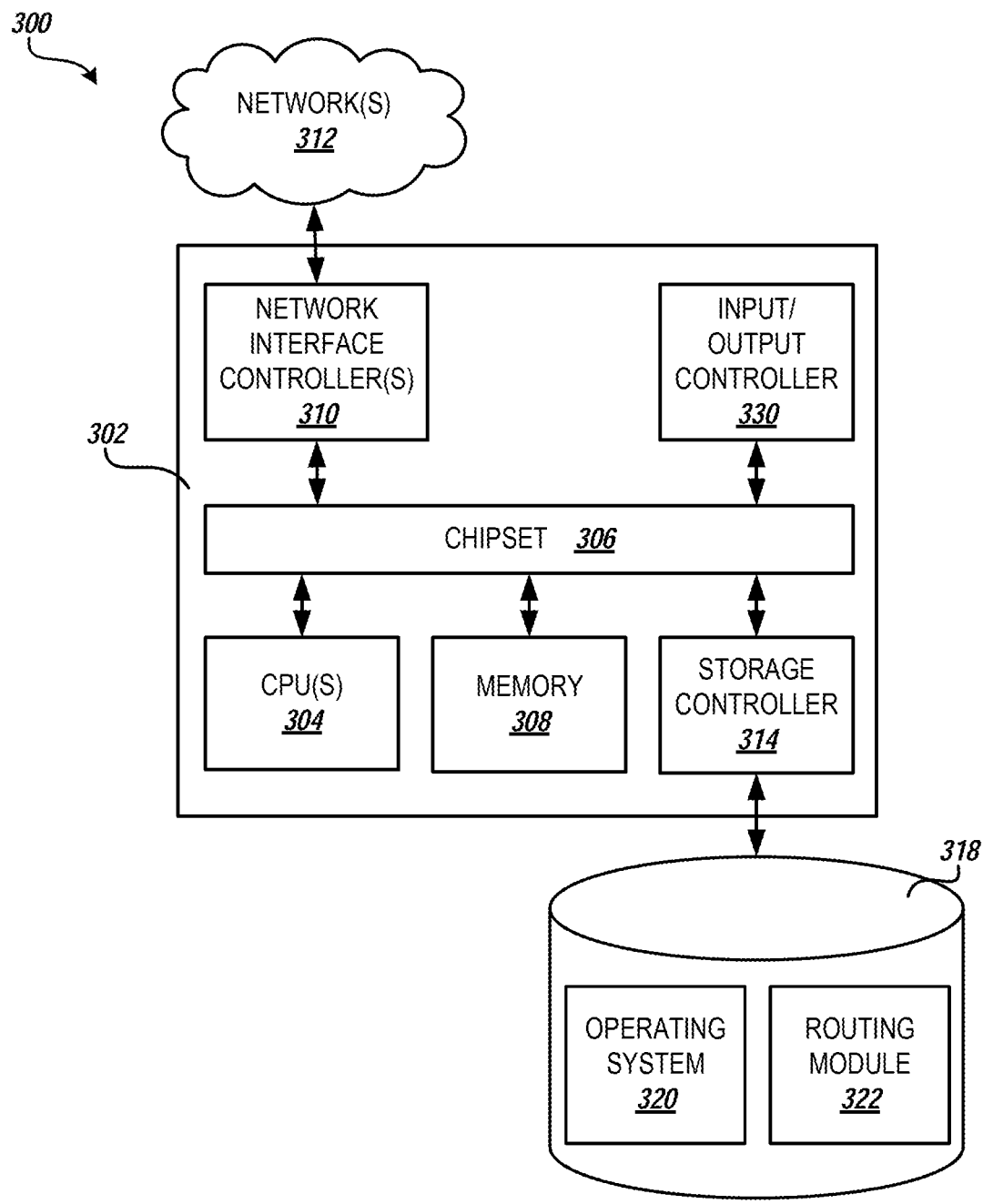
FIG. 3 is a block diagram showing an example computer architecture for a computer capable of executing the software components described herein for the sending of broadcast messages to nodes, and for the processing of responses received from the nodes, according to embodiments described herein.

FIG. 3 shows an example computer architecture 300 for a computer 302 capable of executing the software components described herein for the sending of broadcast messages to downstream devices, and for the processing of responses received from the downstream devices. The computer architecture 300 (also referred to herein as a "server") shown in FIG. 3 illustrates a server computer, workstation, desktop computer, laptop, or other computing device, and may be utilized to execute any aspects of the software components presented herein described as executing on the host 102 (FIG. 1), or other computing platform. The computer 302 preferably includes a baseboard, or "motherboard," which is a printed circuit board to which a multitude of components or devices may be connected by way of a system bus or other electrical communication paths. In one illustrative embodiment, one or more central processing units ("CPUs") 304 operate in conjunction with a chipset 306. The CPUs 304 can be programmable processors that perform arithmetic and logical operations necessary for the operation of the computer 302.

The CPUs 304 preferably perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 306 provides an interface between the CPUs 304 and the remainder of the components and devices on the baseboard. The chipset 306 may provide an interface to a memory 308. The memory 308 may include a random access memory ("RAM") used as the main memory in the computer 302. The memory 308 may further include a computer-readable storage medium such as a read-only memory ("ROM") or non-volatile RAM ("NVRAM") for storing basic routines that that help to startup the computer 302 and to transfer information between the various components and devices. The ROM or NVRAM may also store other software components necessary for the operation of the computer 302 in accordance with the embodiments described herein.

According to various embodiments, the computer 302 may operate in a networked environment using logical connections to remote computing devices through one or more networks 312, such as the wireless mesh network described herein, a local-area network ("LAN"), a wide-area network ("WAN"), the Internet, or any other networking topology known in the art that connects the computer 302 to the devices and other remote computers. The chipset 306 includes functionality for providing network connectivity through one or more network interface controllers ("NICs") 310, such as a gigabit Ethernet adapter. For example, the NIC 310 may be capable of connecting the computer 302 to the devices 22, 108, 114 in the AMI system 100 (FIG. 1) as well as other computer devices in the utility provider's systems. It should be appreciated that any number of NICs 310 may be present in the computer 302, connecting the computer to other types of networks and remote computer systems beyond those described herein.

The computer 302 may be connected to at least one mass storage device 318 that provides non-volatile storage for the computer 302. The mass storage device 318 may store system programs, application programs, other program modules, and data, which are described in greater detail herein. The mass storage device 318 may be connected to the computer 302 through a storage controller 314 connected to the chipset 306. The mass storage device 318 may consist of one or more physical storage units. The storage controller 314 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 302 may store data on the mass storage device 318 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 318 is characterized as primary or secondary storage, or the like. For example, the computer 302 may store information to the mass storage device 318 by issuing instructions through the storage controller 314 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 302 may further read information from the mass storage device 318 by detecting the physical states or characteristics of one or more particular locations within the physical storage units.

The mass storage device 318 may store an operating system 320 utilized to control the operation of the computer 302. According to some embodiments, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 318 may store other system or application programs and data utilized by the computer 302, such as a routing modules 322 utilized by the computer to dynamically determining and assigning parent nodes and routes for nodes in a mesh network, as described herein.

In some embodiments, the mass storage device 318 may be encoded with computer-executable instructions that, when loaded into the computer 302, transforms the computer 302 from being a general-purpose computing system into a special-purpose computer capable of implementing the embodiments described herein. These computer-executable instructions transform the computer 302 by specifying how the CPUs 304 transition between states, as described above. According to some embodiments, the mass storage device 318 stores computer-executable instructions that, when executed by the computer 302, perform portions of the method 400 of managing firmware update communications in a communication network, as described herein with regard to FIG. 4, as well as portions of the method 500 of updating firmware in a communication system, as described herein with regard to FIG. 5. In further embodiments, the computer 302 may have access to other computer-readable storage medium in addition to or as an alternative to the mass storage device 318.

The computer 302 may also include an input/output controller 330 for receiving and processing input from a number of input devices, such as a keyboard, a mouse, a touchpad, a touch screen, an electronic stylus, or other type of input device. Similarly, the input/output controller 330 may provide output to a display device, such as a computer monitor, a flat-panel display, a digital projector, a printer, a plotter, or other type of output device. It will be appreciated that the computer 302 may not include all of the components shown in FIG. 3, may include other components that are not explicitly shown in FIG. 3, or may utilize an architecture completely different than that shown in FIG. 3.

Embodiments of the methods and systems are described below with reference to block diagrams and flowchart illustrations of methods, systems, and apparatuses. It will be understood that each block of the block diagrams and flowchart illustrations, and combinations of blocks in the block diagrams and flowchart illustrations, respectively, can be implemented by program instructions. These program instructions may be programmed into programmable processing elements to produce logic that executes on the processing elements to create means for implementing the functions specified in the flowchart block or blocks, which describe and reference specific algorithms and inherent structure for accomplishing the functions as described and further explained herein.

These program instructions may also be stored in a processor-readable memory that can direct a processing apparatus to function in a particular manner, such that the instructions stored in the processor-readable memory produce an article of manufacture including processor-readable instructions for implementing the function specified in the flowchart block or blocks. The program instructions may also be loaded onto a processing apparatus to cause a series of operational steps to be performed on the programmable apparatus to produce a processor-implemented process such that the instructions that execute on the programmable apparatus provide steps for implementing the functions specified in the flowchart block or blocks.

Accordingly, blocks of the block diagrams and flowchart illustrations support combinations of elements for performing the specified functions, combinations of steps for performing the specified functions and program instructions for performing the specified functions. It will also be understood that each block of the block diagrams and flowchart illustrations, and combinations of blocks in the block diagrams and flowchart illustrations, can be implemented by general purpose or special purpose hardware-based systems that perform the specified functions or steps, or combinations of special purpose hardware and instructions.

Figure 4:
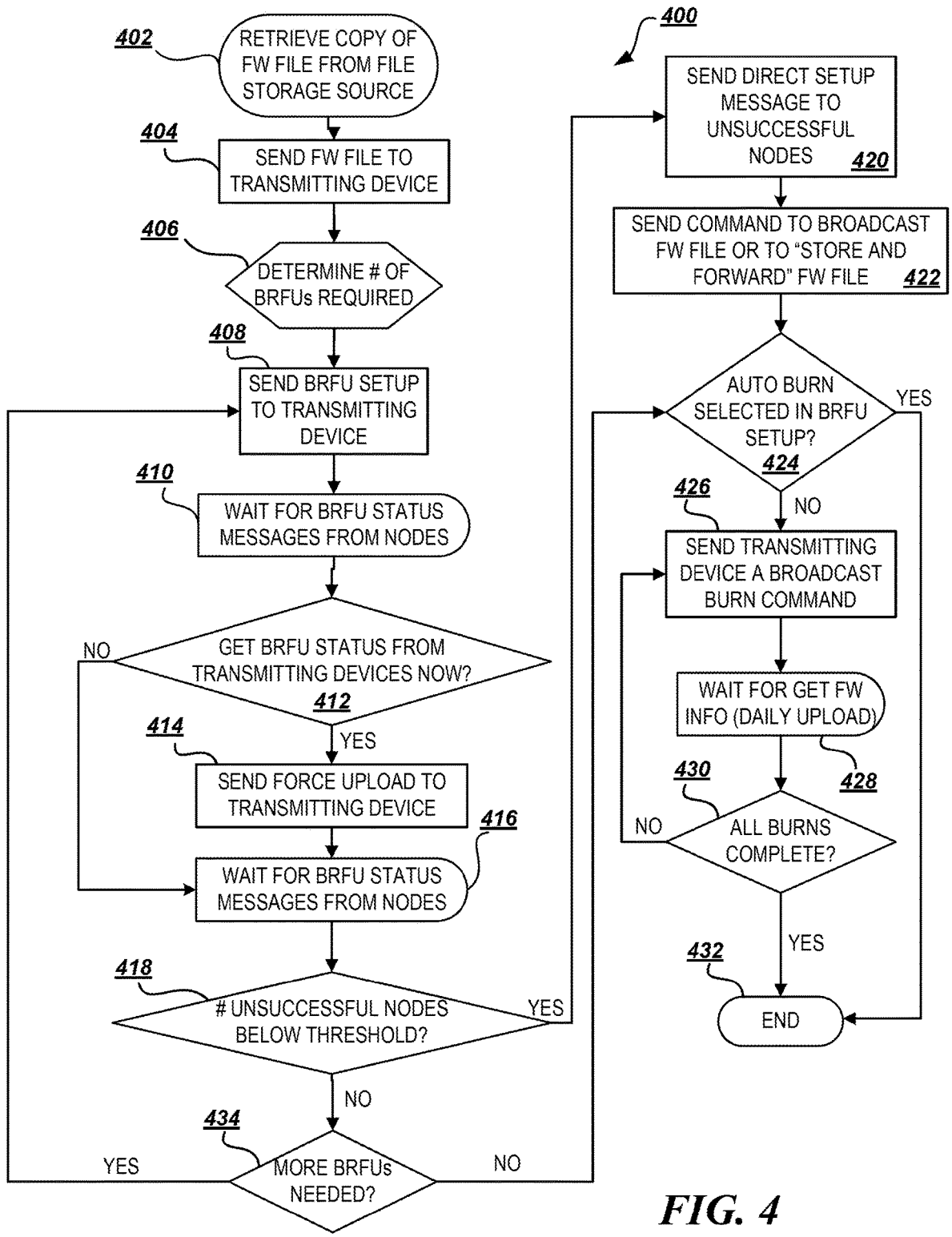
FIG. 4 illustrates a flow diagram of an exemplary method of managing, at an upstream source, firmware update communications between devices in a communication system.

FIG. 4 illustrates a flow diagram of an exemplary method 400 of managing, at an upstream source, firmware update communications between devices in a communication system. Method 400 begins at block 402, in which the upstream source (again, either host 102 or the NMT 106 in FIG. 1) retrieves a copy of an updating firmware ("FW") file from a storage source. In the case of host 102, the storage source is database 103 (FIG. 1), and in the case of NMT 106, the storage source is the cloud 107 (FIG. 1). Next, at block 404, the upstream source sends a copy of the firmware file to a transmitting device, a term used herein to refer to the hub 108 and/or repeater 114 for an AMI system 100 (FIG. 1), as well as to a collector (not shown) for an AMR system. Method 400 proceeds to block 406, where a user determines a number of broadcast remote firmware updates (BRFUs) that are deemed necessary to effect a firmware update for all intended downstream devices. As to be discussed in greater detail herein, a "BRFU" comprises a predetermined number of transmissions of a copy of a firmware file to targeted nodes 200, and an updating "session" may comprise multiple BRFUs of the same firmware file. The transmissions of a copy of the firmware file defining each BRFU are consecutive, as are the repeated BRFUs defining a session, meaning that there are no delays between the sending of each transmission, and no delays between each BRFU in the same session, beyond those intended in a programmed routine governing execution of the BRFU. Such repetition allows the targeted nodes 200 to fill in any portions of the firmware file that it may have missed in preceding broadcasts of the same firmware file, in a manner to be described in further detail with regard to FIG. 6. At block 406, the number of BRFUs, as well as the number of transmissions of firmware file desired per BRFU, can be input as, respectively, a BRFU value and a repetition value, for example, by a user executing a computer program. An example session may thus be defined by 5 BRFUs with 3 transmissions per BRFU, for a total of 15 broadcasts of the same firmware file copy in the session.

Method 400 next advances from block 406 to block 408, where the upstream source sends a BRFU setup message to at least one of the transmitting devices. The BRFU setup message may be a configuration file, also referred to as a command file. The BRFU setup message contains several items of information, including but not limited to a session number (also called a session identification (ID)), a wake time at which targeted nodes 200 in the communication system 100 should wake from a sleeping state, and as well as a channel to which each targeted node 200 should tune after waking. The session number (session ID) informs the target node, for example, whether a BRFU is part of a same session as a previously-transmitted BRFU. Additionally, the BRFU setup message may contain filtering information to limit the firmware update to only a subset of the plurality of nodes 200 present in the system 100. Thus, for example, the BRFU setup message may include a message field designation corresponding to only a particular type of node 200 (such as only AMI nodes 200).

Next, at block 410, the upstream source reaches an idle (also called timeout) state, for a delay period defined in the BRFU setup message, in which it awaits BRFU status messages from targeted nodes, which are transmitted to the upstream source via the transmitting devices. Among the types of information that may be included in a BRFU status message are: a copy of the message requesting the BRFU status message; the session ID (discussed in greater detail with regard to FIG. 6, below); the firmware version currently running in the downstream device; completion status, which can be denoted an "UpgradeStatus" message field (for instance, a "3" could indicate a successful burn of the firmware file, meaning that the downstream device succeeded in storing a complete copy of the firmware file in its external memory, such that the downstream device now has a good and complete copy of the firmware file); number of free blocks of downstream device memory (so if more blocks are free than should be free, the upstream source knows that the downstream device has not yet received every data packet in the firmware file); and the number of times that the same firmware file has been sent or received. Blocks in FIGS. 4 and 5 recite the term "nodes," but it is to be understood that this term is used in FIGS. 4 and 5 as a shorthand expression that includes all system devices downstream of the transmitting device. For example, if the transmitting device is a hub 108 (FIG. 1), then the term "nodes" as used in FIGS. 4 and 5 encompasses a repeater 114 (FIG. 1) as well as the nodes 200. The delay period symbolized at block 410 provides the opportunity for the upstream source to consider, at decision block 412, whether to continue waiting for the BRFU status messages or, instead, obtain those messages on demand. If it is desired to obtain BRFU status messages on demand, without waiting for the full duration of the delay period that would otherwise ensue, then method 400 advances to block 414, in which the upstream source sends a force upload command to the transmitting device. Method 400 then proceeds to block 416, where another delay period (however small) occurs to allow receipt of the BRFU status messages that had been stored in the transmitting devices. If, at decision block 412, the user does not decide to send a force upload command, then the delay period initiated at block 410 simply continues at block 416. The delay period at block 416 maximizes the opportunity for the upstream source to receive all BRFU status messages that may have been sent. Once the delay period at block 416 elapses, method 400 proceeds to decision block 418. The total length of the delay period (blocks 410 and 416 together) varies; illustrative examples are 4-hour and 24-hour durations. In one aspect of the disclosed implementation, it is intentional to not wait at all for responses from downstream devices, so that the methods disclosed herein are faster for large firmware files being transmitted to many downstream devices.

After receiving the BRFU status messages from at least one transmitting device, the upstream source analyzes information received from each transmitting device to quantify a number of targeted downstream devices that did not successfully store an entire copy of the firmware file in their respective external memories 250 (FIG. 2), such devices comprising unsuccessful downstream devices (unsuccessful nodes). At decision block 418, the upstream source determines whether the number of unsuccessful nodes falls below a predetermined threshold. This step is for the purpose of determining whether the next communication of an updating firmware file should be done as a BRFU or, instead, as a directed firmware update. If the number of unsuccessful nodes is sufficiently small, i.e., the number of unsuccessful nodes falls below the predetermined threshold (such as, for example, 1% of all targeted nodes), then the firmware updating process can be initiated through the sending of direct messages, as at block 420, where a direct setup message is sent directly from the upstream source to the unsuccessful nodes. (The direct setup message is structured identically to the BRFU setup message, except that one of its message fields indicate specified node addresses instead of any type of broadcast designation.) Then, at block 422, the upstream source sends a command to a transmitting device to broadcast the firmware file to each unsuccessful node. This allows use of a non-frequency-hopping channel, which is faster than accomplishing communications in which channel hopping is required. Alternatively, at block 422, the upstream source may send a "store and forward" command to the transmitting device. Unlike a broadcast, a "store and forward" command is individually addressed to each unsuccessful downstream device on a frequency-hopping channel to accomplish storage of the firmware file via a hail message sent to each such device. Frequency-hopping also involves communication of acknowledgement (ACK) signals in a manner such as that discussed in U.S. patent application Ser. No. 15/583,263, now U.S. Pat. No. 10,178,617, the disclosure of which is hereby specifically incorporated by reference herein in its entirety. The communication of ACK signals can make the "store and forward" command a more suitable option than broadcasts for noisy environments. From block 422, method 400 proceeds to block 424, to be described herein.

A firmware file broadcast differs from a hail message, in that no immediate response is expected from the targeted nodes 200; no ping message, pong message, or ACK signal is sent in the firmware file broadcast. Sending a firmware file as a broadcast, without such types of immediate responses, allows the updating of firmware to progress much more rapidly than would otherwise be the case. A firmware file may comprise as many as 1000 data packets, each packet filling a memory block and having a length of 100 bytes. Each data packet also has a specific memory address associated with it, so that as each data packet is received in the external memory 250 (FIG. 2) of node 200, the data packet is saved in the block of the external memory 250 at that memory address. A transmission of a copy of a firmware file thus involves the sequential sending of one data packet after another. For all targeted downstream devices that did not receive a complete copy of the updating firmware file in one or more previous transmissions, and which thus have vacant memory blocks at memory addresses identified in the transmitted data packets, ensuing transmissions of the same updating firmware file allow such downstream devices to "fill in" those vacant memory blocks. Transmitted data packets designated by a memory address of a memory block previously "filled in" during the session are disregarded by the targeted downstream device. If, for example, a packet with a memory block address "200" is received by the downstream device, but for some reason the downstream device did not save it, then address "200" in the external memory of the downstream device will still have only the hex value "0xFF" stored therein (a characteristic of an erased medium as discussed below). In an ensuing, repeated transmission of data packet with the "200" address, the downstream device will know that this data packet still needs to be stored in memory block "200." Forward error correction could also be used to address failures to store data packets. In other implementations of the present disclosure, a data packet may be identified by a packet number instead of by a memory address.

Regardless of whether a broadcasted firmware file is sent in a BRFU or as a directed firmware update, channel hopping is not necessary, since any broadcast message uses 500 kHz-bandwidth channels, allowing minimal delay between packets. There are preferably 24 channels within the 500 kHz bandwidth, with 16 of those channels used for hailing messages (here, BRFU setup messages), and the remaining channels used for firmware file transmissions. Such channel usage is discussed only for exemplary purposes and is not intended to be limiting. For instance, in another implementation of the present disclosure, copies of the firmware file could be sent over 125 kHz-bandwidth channels, with channel hopping, as discussed above with regard to "store and forward" commands.

Referring again to FIG. 4, method 400 advances to a series of blocks associated with burning the firmware files in the nodes that have made complete copies of the firmware file in their respective external memories 250 (FIG. 2). For a targeted node to "burn" a firmware file means to transfer that file from the external memory 250 into a built-in memory such as the built-in memory 221 in processor 220 (FIG. 2), such that the firmware file, once burned into the built-in memory, can no longer be unintentionally erased and henceforth becomes the source of instructions for how the targeted downstream device (targeted node 200) operates. At decision block 424, the upstream source is queried as to whether an auto-burn command was included in the BRFU setup message. An auto-burn command directs all targeted downstream devices that sent a BRFU status message to burn their saved firmware files to their respective internal memories just after sending their BRFU status message. If an auto-burn command was selected in the BRFU setup message, then method 400 skips from decision block 426 to end block 432.

Although an auto-burn command is usually desirable, sometimes a user may not want all downstream devices in a system to undergo a firmware update simultaneously, which may be the case if the new firmware is not backwards-compatible, or if communication protocol is changing such that some downstream devices have an updated protocol that others do not. In such instances, the BRFU setup message will not contain an auto-burn command, and the method 400 advances from decision block 424 to block 426, where the upstream source sends a broadcast burn command to at least one transmitting device in the system 100, which usually results in the continued downstream progression of the command to the targeted nodes 200, but which, as will be discussed in greater detail herein with regard to FIG. 5, can sometimes result in the transmitting device implementing in itself the firmware update received from the upstream source, instead of transmitting the broadcast burn command further downstream. Once the upstream source sends the broadcast burn command to all intended transmitting devices, the method 400 advances to block 428, where the upstream source waits to receive "Get Firmware Information" responses that originated from all downstream devices that successfully burned their updating firmware files. These responses, which indicate successful burns as well as the firmware version now running on the downstream devices sending those responses, are automatically sent by all such downstream devices upon successful burning of their copies of the updating firmware file. However, the transmitting devices and the upstream source, particularly in an AMI system, need not receive "Get Firmware Information" responses at the moment they are sent. Instead, as discussed in greater detail with regard to FIG. 6, they can be scheduled to be sent at regular (such as daily) intervals. Thus, until the scheduled response arrives, the upstream source remains in an idle state at block 428. Once the periodic uploaded responses are received by the upstream source, method 400 advances to decision block 430, where it is determined whether all burns of the updating firmware file are complete. The firmware information received by the upstream source from the transmitting device identifies all targeted nodes that burned the firmware file into their respective internal memories. At decision block 430, the upstream source analyzes the firmware information to determine whether a number of successful nodes is less than a number of targeted nodes. Responsive to a determination that the number of successful nodes is less than the number of targeted nodes, method 400 loops back, from decision block 430 to block 426, where method 400 repeats the step of sending a broadcast burn command to at least one transmitting device. Otherwise, all burns are complete, and method 400 then advances to block 432, where it ends.

Referring again to decision block 418 of FIG. 4, if the number of unsuccessful nodes ascertained is not below the predetermined threshold, then direct messages will not yet be sent, and method 400 advances to decision block 434, where the upstream source is queried as to whether more BRFUs are needed. This step can be achieved with a counter function in programming instructions, whereby the number of any preceding BRFUs conducted in the same session is counted, and the counted value compared to the value input at block 406. If the number of preceding BRFUs in the same session is less than the value input at block 406, then another BRFU will be conducted, and the method 400 loops back to block 408, in which another BRFU setup message is sent to initiate another BRFU. Otherwise, at decision block 434, if the number of BRFUs in the same session equals the value input at block 406, then no more BRFUs will be conducted in the session, and method 400 branches to decision block 424, from where method 400 progresses through the illustrated burn-related steps in the same manner previously described above. Instead of a counter function for defining a limit of the number of BRFUs conducted, a time function could be used, such that the BRFUs within a session are continuously repeated but only for a predetermined time period.

Figure 5:
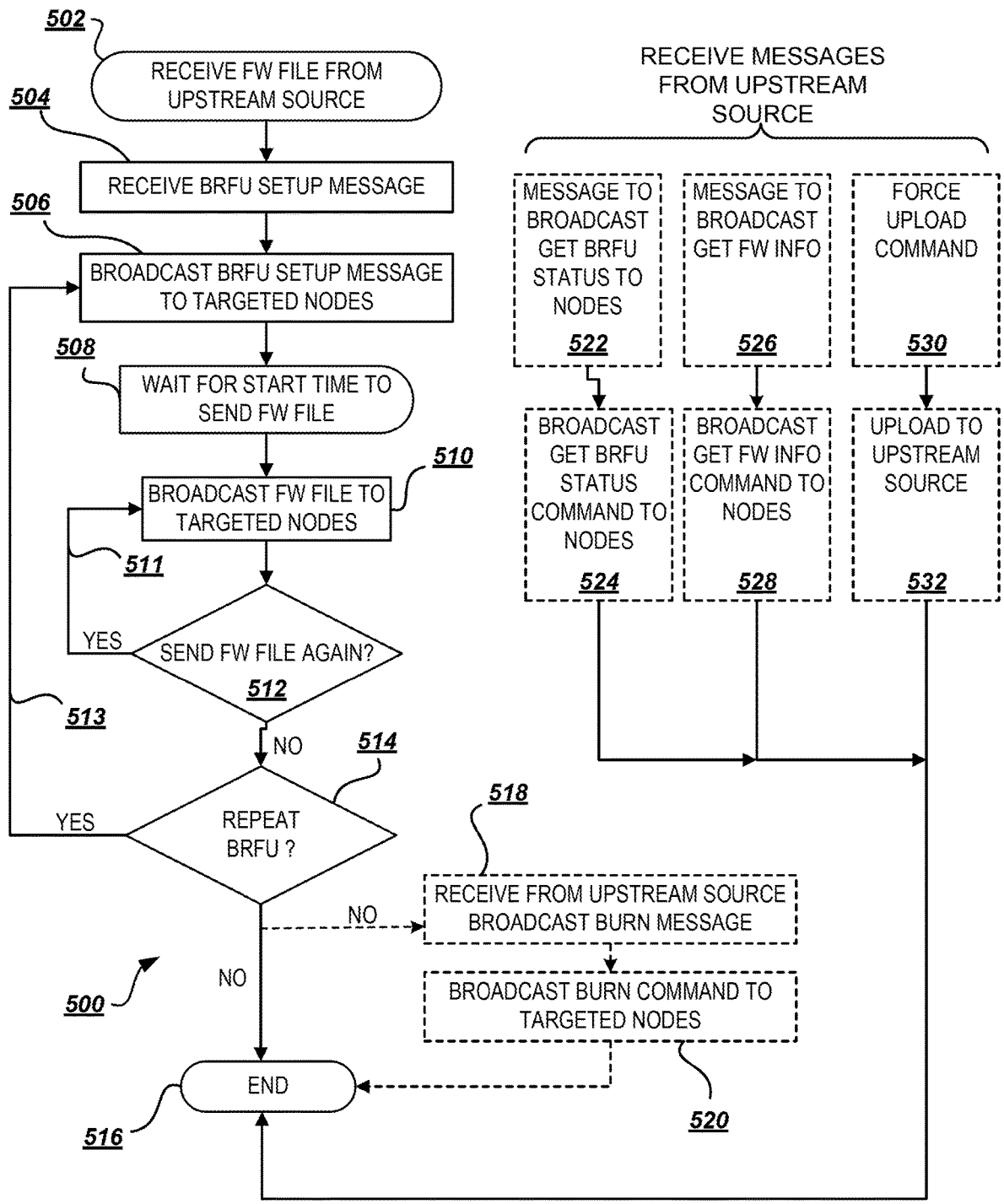
FIG. 5 illustrates a flow diagram of an exemplary method of broadcasting firmware updating messages in a communication system.

FIG. 5 illustrates a flow diagram of an exemplary method 500 of broadcasting firmware updating messages in a communication system, such as system 100 (FIG. 1). Method 500 focuses on operations executed by the transmitting devices in system 100 which, as already stated, encompass both hubs and repeaters in an AMI system, and collectors in an AMR system.

Method 500 begins at block 502, where the transmitting device receives an updating firmware file from the upstream source. This can be done as a download of a copy of the updating firmware file into memory of the transmitting device. Next, at block 504, the transmitting device receives a BRFU setup message from the upstream source, the content of the BRFU setup message previously described above with regard to FIG. 4. Additionally, the BRFU setup message will include information indicating how many BRFUs are to be run, that number determined at block 406 of FIG. 4, as discussed above. The LFM 111 (FIG. 1) that may be present in the transmitting device immediately decides the times at which it will broadcast each BRFU to downstream devices. For example, upon receiving the BRFU setup message from the upstream source, the LFM 111 may schedule a three-BRFU session as follows: the first at 1:05 a.m., the second at 1:35 a.m., and the third at 2:05 a.m. In other implementations, the broadcast times need not be stated as exact times but can be, instead, designated time intervals from the time at which the LFM 111 received the BRFU setup message, such as, for example, 3.0 hours after receipt, 3.5 hours after receipt, then 4.0 hours after receipt, etc. Note that it may take many minutes to transmit the BRFU setup message, so the upstream source may send the BRFU setup message to the LFM 111 many minutes before a contemplated start time of the BRFU, to make sure all receiving downstream devices (nodes) receive the BRFU setup message and set an event to wake up to start receiving the BRFU setup message. So, for example, the upstream source may start the BRFU Setup message a half hour before a contemplated BRFU transmission start time. The aforementioned functions of the LFM 111 could alternatively be performed in a hub or collector, or in a network server for networks that do not have hubs or collectors, such as in an open network (a LoRaWAN network, for example).

Once the LFM 111 completes its scheduling, then, at block 506, the transmitting device broadcasts the BRFU setup message to all targeted devices downstream of the transmitting device. For each BRFU to be conducted in the session, the transmitting device transmits the BRFU setup message on a first channel (which may be a hailing channel) to a plurality of targeted nodes, the BRFU setup message specifying a wake time at which each targeted node should wake from a sleeping state, and specifying a second channel (which may be a data channel) to which each targeted node should tune after waking. Following the broadcast of the BRFU set message to the targeted nodes 200, the transmitting device waits, at block 508, for the start time of the next-scheduled BRFU. In other implementations of the present disclosure, the transmitting device could create a separate "broadcast receiver setup message," based on the BRFU setup message it received from the upstream device, and then transmit that "broadcast receiver setup message" to the targeted nodes. Regarding the targeted nodes' receipt of information in the BRFU setup message concerning the number of BRFUs to be run and the number of transmissions of the firmware file to be made in each BRFU, the nodes do not use such information other than to calculate expected session finish times for purposes of determining timing for future functions.

At block 510, the transmitting device may broadcast a copy of the firmware file on the second (data) channel to the plurality of targeted nodes 200, with a first transmission in the BRFU commencing after a delay following the wake time specified in the BRFU setup message. Thus, in the example given above, for a first BRFU starting at 1:05 a.m., the BRFU setup message would broadcast a wake time of 1:00 a.m. if it takes a delay of 5 minutes for a node 200 to wake and prepare to receive the BRFU. As another example, the first transmission of the copy of the firmware file may commence without any delay after a targeted downstream device wakes. In such implementations, a downstream device could, for instance, be configured to wake one second (or another suitable time increment) before the wake time specified in the BRFU setup message. Thus, the wake time and the time of commencement of the first transmission in the BRFU may be the same, in such implementations. In some implementations of method 500, the step at block 510 may not be present, depending on the content of a message field in the BRFU setup message instructing the transmitting device how to handle the file received from the upstream source. For instance, a "ConfigType" message field in the BRFU setup message may be set to either "0" or "1." A "0" value can be read by the transmitting device as an instruction to broadcast the firmware file to the nodes, as described with regard to block 510, above. However, a "1" can be interpreted by the transmitting device as an instruction to not broadcast a firmware file, and for the transmitting device to function merely as a slave device to the upstream source. In such an implementation, the "1" value could result in the transmitting device itself having its own firmware updated by burning the firmware file received from the upstream source at block 502, above. When the transmitting device receives a BRFU setup message with a "0" in the "ConfigType" message field, before it broadcasts the BRFU setup message to targeted downstream devices that are designated to burn copies of the updating firmware file, it will change the "0" value in that message field to a "1," thus indicating that the targeted downstream device receiving the message will not re-broadcast the copy of the firmware file, but will instead ultimately burn its copy of the firmware file. In other implementations, a transmitting device could have its own firmware updated on one channel while broadcasting a firmware file to other downstream devices on another channel.

Still referring to FIG. 5, after the broadcast of the firmware file at block 510, method 500 proceeds to decision block 512, where it is decided whether to send the updating firmware file again. The decision rests on what values have been entered at block 406 of FIG. 4, above. If the number of transmissions of the same copy of the firmware file in the same BRFU has not yet equaled the repetition value entered at block 406, then method 500 loops back, from block 512 to block 510 (forming an "inner loop" 511), where the transmitting device executes another transmission by again transmitting (broadcasting) the copy of the firmware file to the targeted downstream devices. If, on the other hand, the repetition value has been reached, then the BRFU has concluded, and method 500 advances to decision block 514, which corresponds to decision block 434 of FIG. 4, above. If the number of BRFUs conducted in the same session has not yet equaled the BRFU value input at block 406 of FIG. 4, above, then method 500 loops back from block 514 to block 506 (forming an "outer loop" 513), where the transmitting device broadcasts another BRFU setup message to the downstream devices. If, on the other hand, the number of BRFUs conducted in the same session equals the BRFU value input at block 406 of FIG. 4, above, then method 500 may advance to block 516, where it ends. However, method 500 may instead, at a predesignated time proceed from decision block 514 to block 518, where the transmitting device receives a broadcast burn message from the upstream source. After receiving such a message, the transmitting device, at block 520, broadcasts the burn command to all targeted downstream devices (targeted nodes). Method 500 can then proceed to end block 516.

FIG. 5 also illustrates the receipt of other types of messages from the upstream source that need not always occur during method 500. For instance, at any time, the transmitting device may receive, at block 522, a message to broadcast a "Get BRFU Status" command to downstream devices (nodes). Following receipt of such a message, the transmitting device, at block 524, broadcasts the "Get BRFU Status" command to those downstream devices. The transmitting device may also, at any time, at block 526, receive a message from the upstream source to broadcast a "Get Firmware Information" command to the downstream devices (nodes). Following receipt of such a message, the transmitting device, at block 528, broadcasts the "Get Firmware Information" command to those downstream devices. Finally, as has been discussed with regard to blocks 412 and 414 of FIG. 4, above, the upstream source may send a "force upload" command. The reception of such a command by the transmitting device is depicted at block 530. Upon receiving such a command, the transmitting device, at block 532, uploads to the upstream source the BRFU status command responses that the transmitting device had previously received from downstream devices.

Figure 6:
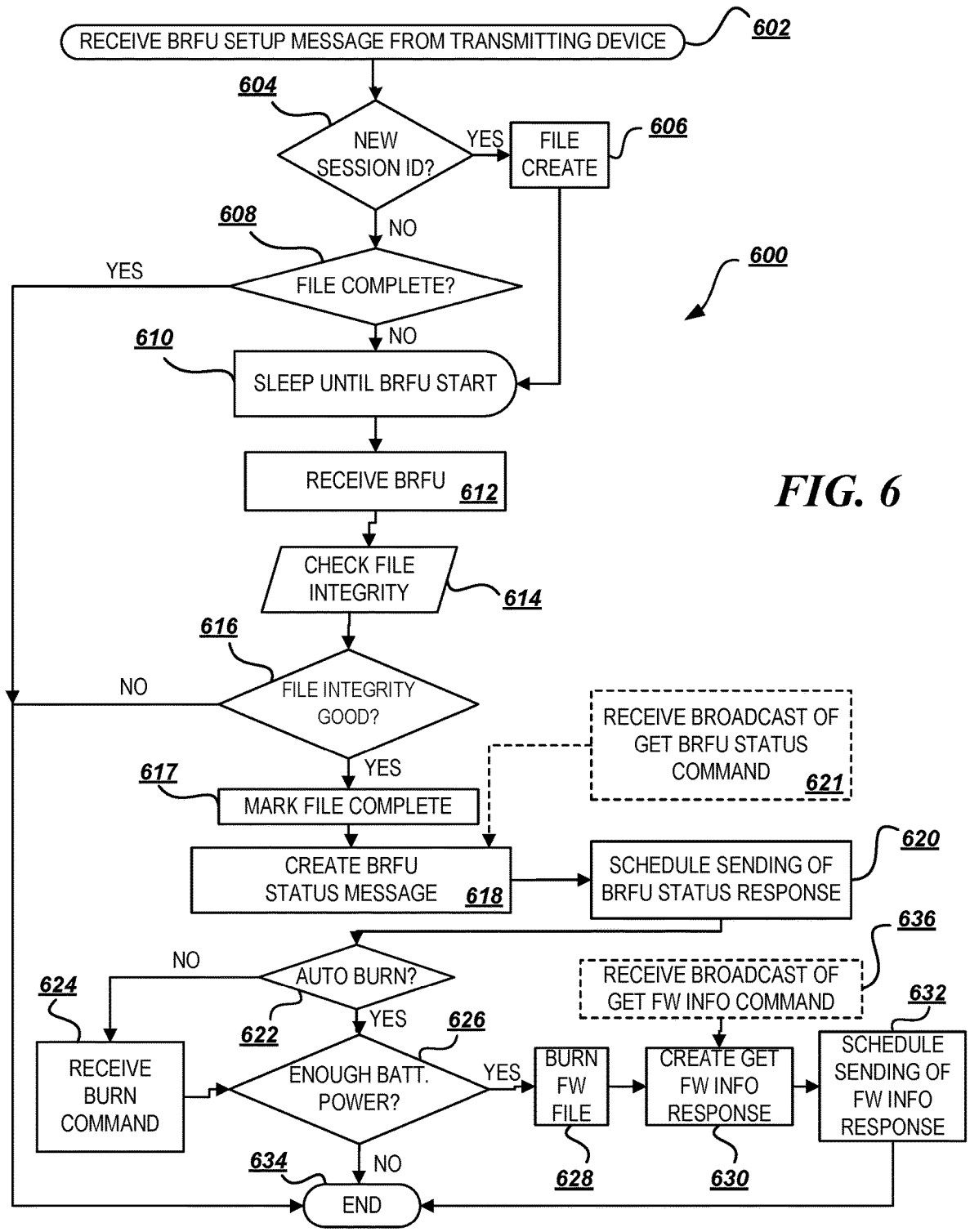
FIG. 6 illustrates a flow diagram of an exemplary method of processing firmware update messages at a targeted downstream device in a communication system.

FIG. 6 illustrates a flow diagram of an exemplary method 600 of processing firmware update messages at a targeted downstream device in the communication system 100 (FIG. 1). Method 600 begins at block 602, where the targeted downstream device receives a BRFU setup message from its parent, which could be a parent node 200, a repeater 114, or a hub 108 (FIG. 1). In an AMR system, the parent could be a collector instead of a hub. From block 602, method 600 advances to decision block 604, where the targeted downstream device assesses whether the session ID contained in the received BRFU setup message identifies a new session, i.e., whether the session ID in the BRFU setup message just received differs from a session ID in a preceding BRFU setup message received by that same targeted downstream device. A session ID is changed whenever an upcoming BRFU will be of a firmware file comprising a new firmware version. As discussed above, a session comprises a predetermined number of consecutive repeated BRFUs. In some situations, the same session ID can be used for different sessions. For instance, assume that a first session of five BRFUs was conducted, but that for some reason, one or more targeted downstream devices still have not succeeded in storing a complete copy of the updating firmware file in their respective external memories. Thus, another BRFU session will be required for those remaining devices to successfully store such a complete copy. When the same session ID is then used in an ensuing session, those remaining devices can just resume their attempts to save data packets from the point they were at when the preceding session concluded. In other words, with the same session ID being used, such devices do not need to start all over again in the new session when trying to save a complete copy of the updating firmware file—their progress from the preceding session(s) is retained.

If the session ID in the BRFU setup message is new, then method 600 advances from decision block 604 to "file create" block 606, where the targeted downstream device will know to delete (erase) whatever files it may have previously saved in its external memory 250 (FIG. 2), in preparation for receiving the new firmware file. Erasing the external memory 250 inserts the hex value of "0xFF" in all the locations of the external memory 250. From block 606, method 600 continues to block 610, where the targeted downstream device sleeps until the designated start time of the next BRFU. If, at decision block 604, it is determined that the session ID in the BRFU setup message is not new, then method 600 bypasses block 606 and proceeds directly from decision block 604 to decision block 608, where it is determined whether a good and complete copy of the firmware file is already present in the external memory of the targeted downstream device. If so, then method 600 skips to block 634, where it ends, in which event the targeted downstream device will ignore any subsequent BRFUs within the same session. Otherwise, method 600 advances to block 610, already described above.

At block 612, the targeted downstream device has woken at a time specified in the BRFU setup message and receives a BRFU, transmission by transmission, and data packet by data packet with each transmission, in the manner previously described above with regard to FIGS. 4 and 5. At the end of each BRFU, the targeted downstream device performs a file integrity check (which may be a cyclic redundancy check, or CRC) of the firmware file, as indicated at block 614. If the targeted downstream device determines at decision block 616 that the file integrity is not good, then method 600 skips to block 634, where method 600 ends. Otherwise the copied firmware file is good and complete, and method 600 advances to block 617, where the file is marked complete, and then to block 618, where the targeted downstream device creates a BRFU status message that will be sent upstream to the upstream source, the content of the BRFU status message described above with regard to block 410 of FIG. 4.

Absent a specific command (to be explained herein with regard to block 621), the targeted downstream device schedules the sending its BRFU status response at block 620. As mentioned above, when a downstream device sends a response, it preferably does so in an upstream progression, in one example. In the first stage of that progression, the downstream device sends a hail message (also called a "ping" message) to its parent, receives a "pong" message from the parent, and then, following receipt of the "pong" message, sends its response to the parent. The hailing by the downstream device can be executed according to the aforementioned U.S. Pat. No. 10,178,617, incorporated by reference above. Within the BRFU setup message, the upstream source will have specified the manner in which the targeted downstream device will send its BRFU status message. The upstream source may optionally request the status be sent at a random time within a response window set by the upstream source or have the responses add to the next daily upload, in the manner described in the aforementioned U.S. Pat. No. 10,560,968, previously incorporated by reference above. If the BRFU is being sent by a repeater 114 (FIG. 1), the repeater 114 will receive the BRFU responses for each responding downstream device and add them to its daily upload queue. Therefore if the upstream source wants to obtain the BRFU status information earlier, it must send a "Force Upload" command to the repeater 114, in the manner previously explained with regard to blocks 530 and 532 of FIG. 5. Similarly, if the transmitting device (such as repeater 114) wants to obtain the BRFU status information earlier than a regularly-scheduled upload from the targeted downstream device, then it sends a "Get BRFU Status" command to the targeted downstream device. This results in the targeted downstream device receiving that command at block 619, and method 600 then proceeds from block 619 to 618.

Still referring to FIG. 6, method 600 advances from block 620 to decision block 622, where the downstream device checks the incoming BRFU setup message to determine whether an auto-burn flag in a memory register of the downstream device was set. An auto-burn command directs all targeted downstream devices that sent a BRFU status message to burn their saved firmware files to their respective internal memories just after sending their BRFU status message, as discussed above with regard to FIG. 4. If an auto-burn command was present in the BRFU setup message (e.g., the auto-burn flag was set), then method 400 advances from decision block 622 to decision block 626, where the downstream device assesses whether it has sufficient battery power to perform the burning of the firmware file. The downstream device may be configured as described in the aforementioned U.S. Pat. No. 10,178,617, incorporated by reference above, to sense and manage its battery power. If it is determined at decision block 626 that the battery power is insufficient to execute the burn, then method 600 proceeds to end block 634. Otherwise, method 600 continues and advances to block 628, where the downstream device burns the updating firmware file into a built-in memory (such as built-in memory 221 in FIG. 2). The downstream device then, at block 630, creates its "Get Firmware Information" response, previously described above with regard to block 430 of FIG. 4, schedules that response at block 632 in the same manner described with regard to the scheduling of its BRFU status response (block 620), and completes method 600 by then advancing to end block 634. If the upstream source decides to obtain firmware information from targeted downstream devices before receiving it according to a regular schedule, then it issues the command to the transmitting device to broadcast the "Get Firmware Information" command, previously described above with regard to blocks 526 and 528 of FIG. 5. This results in the targeted downstream device receiving that command at block 636. From that block, method 600 progresses to blocks 630, 632, and 634 as described above.

Referring back to decision block 622 of FIG. 6, if an auto-burn command was not present in the BRFU setup message, then method 600 branches to block 624, where the targeted downstream node receives a broadcast burn command from its parent, the nature of that command described above with regard to blocks 518 and 520 of FIG. 5. The burn command must come from the parent of the targeted downstream device, or else the command will not be executed. In this manner, an implementation according to one aspect of the disclosure minimizes chances that any burn command would be executed by a device outside of system 100 (FIG.

1). From block 624, method 600 proceeds to decision block 626 and then to subsequent blocks in the same manner described above.

In another aspect of the current disclosure, a method (and devices providing methods disclosed herein) of processing firmware update messages in a communication system, comprises the steps of receiving, at a targeted downstream device on a first channel, a setup message from a transmitting device, the setup message specifying a session identification (ID), a wake time at which each targeted downstream device should wake from a sleeping state, and specifying a second channel to which each targeted downstream device should tune after waking; determining whether the session ID denotes a new session, each session defined according to a preset number of consecutive times in which a firmware file is to be sent to the targeted downstream device; and responsive to a determination that the session ID does not denote a new session, receiving a copy of a firmware file over the second channel after a delay following the wake time specified in the setup message.

In yet another aspect of the current disclosure, a communication system comprises an upstream source, the upstream source selected from one of a server and a network management tool, wherein the server communicates with a database containing a firmware file, and wherein the network management tool comprises a computer application that communicates with a cloud containing the firmware file; at least one transmitting device operatively connected to the upstream source, the transmitting device selected from at least one of a hub, a collector, and a repeater, and a plurality of downstream devices operatively connected to both the upstream source and the transmitting device; wherein the upstream source is configured to transmit, to the at least one transmitting device, a BRFU setup message and a copy of the firmware file, the BRFU setup message specifying a wake time at which a targeted subset of the plurality of downstream devices should wake from a sleeping state, and specifying a channel to which each downstream device in the targeted subset should tune after waking; wherein the transmitting device is configured to transmit the BRFU setup message on another channel to the targeted subset; and wherein the transmitting device is configured to broadcast a BRFU of the copy of the firmware file on the channel to the targeted subset, the BRFU comprising a predetermined number of transmissions of the copy of the firmware file to the targeted subset, a first transmission in the BRFU commencing after a delay following the wake time specified in the BRFU setup message.

The system and methods herein disclosed allow all downstream devices targeted for a firmware update to listen for and process a BRFU simultaneously.

It is contemplated that different implementations of the present disclosure may use one or more servers in place of the transmitting devices (hubs 108 and repeaters 114 of FIG. 1) disclosed above. In one such an implementation, a single server, such as server 300 (FIG. 3) may both manage all BRFU-related communications and directly exchange such communications with the nodes 200 in the communication system 100. Alternatively, two or more servers may work in tandem to communicate with the nodes 200. In such an implementation, a first server could function in the same manner as the upstream sources disclosed above, and a second server in communication with the first server would take the place of a hub 108 or repeater 114 (FIG. 1).

Various other modifications are contemplated as being within the scope of the present disclosure. Some implementations of the present disclosure may not require the upstream source to actively retrieve a firmware file; instead, in such implementations, the upstream source may simply passively receive the firmware file from another source prior to executing the other process steps disclosed above. In other implementations, the BRFU setup message may not include message fields regarding wake times or regarding the targeting of any particular subsets of downstream devices. In still other implementations, other communication architectures can be used such that there are no instructions to change to one or more particular channels to receive a firmware file. Furthermore, although the foregoing description discloses complete upgrades of firmware, in other implementations of the present disclosure, the downstream devices may be configured to accept partial firmware upgrades.

The above description is provided as an enabling teaching in its best, currently known embodiments. To this end, those skilled in the relevant art will recognize and appreciate that many changes can be made to the various disclosed aspects described herein, while still obtaining the beneficial results of the present disclosure. It will also be apparent that some of the desired benefits can be obtained by selecting some of the features without utilizing or including other features. Accordingly, those who work in the art will recognize that many modifications and adaptations are possible and can even be desirable in certain circumstances and are a part of the present disclosure. Thus, the above description is provided as illustrative of the principles of the present disclosure and not in limitation thereof. In addition, as used throughout, the singular forms "a," "an" and "the" include plural referents unless the context clearly dictates otherwise. Thus, for example, reference to "a panel" can include two or more such panels unless the context indicates otherwise. Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For purposes of the current disclosure, a material property or dimension measuring about X on a particular measurement scale measures within a range between X plus and industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances. As used herein, the terms "optional" or "optionally" mean that the subsequently described event or circumstance may or may not occur, and that the description comprises instances where said event or circumstance occurs and instances where it does not. It is further understood that the disclosure is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described disclosure, nor the claims which follow.

That which is claimed is:

1. A method of managing firmware update communications between devices in a communication system, comprising the steps of:
retrieving, at an upstream source, a copy of a firmware file from a file storage source, wherein the upstream source is selected from one of a server and a network management tool;
sending the copy of the firmware file from the upstream source to at least one transmitting device selected from a hub, a collector, and a repeater;
receiving input of a predetermined number of times that the copy of the firmware file is to be repeatedly broadcasted by the at least one transmitting device to comprise one broadcast remote firmware update (BRFU);
receiving input of a predefined limit of BRFUs to be executed within a session;
sending a BRFU setup message from the upstream source to the at least one transmitting device, the BRFU setup message specifying a wake time at which downstream devices targeted by the BRFU setup message should wake from a sleeping state to receive the copy of the firmware file, such devices comprising targeted downstream devices, and specifying a channel to which each targeted downstream device should tune after waking;
following completion of a BRFU, quantifying a number of unsuccessful downstream devices, the unsuccessful downstream devices comprising targeted downstream devices that did not successfully store an entire copy of the firmware file;
determining whether the number of unsuccessful downstream devices falls below a predetermined threshold;
responsive to a determination that the number of unsuccessful downstream devices falls below the predetermined threshold, conducting a directed firmware update addressed to each unsuccessful downstream device, comprising the steps of
sending a direct setup message directly from the upstream source over a hailing channel to each unsuccessful downstream device, the direct setup message specifying a next wake time at which each unsuccessful downstream device should wake to again receive the copy of the firmware file and specifying a data channel to which each unsuccessful downstream device should tune after waking at the next wake time, and
causing the at least one transmitting device to perform one of broadcasting the copy of the firmware file to each unsuccessful downstream device and sending the copy of the firmware file over the data channel to each unsuccessful downstream device;
responsive to a determination that the number of unsuccessful downstream devices does not fall below the predetermined threshold, determining whether the predefined limit of BRFUs has been reached;
responsive to a determination that the predefined limit of BRFUs has not been reached, initiating another BRFU by sending another BRFU setup message to the at least one transmitting device; and
responsive to a determination that the predefined limit of BRFUs has been reached,
sending a broadcast burn command to the at least one transmitting device, and
receiving firmware information from the transmitting device, the firmware information identifying all targeted downstream devices that burned the firmware file into respective memories located in the targeted downstream devices, such downstream devices comprising successful downstream devices, and specifying a version of firmware running on the successful downstream devices.

2. The method of claim 1, wherein the upstream source comprises one of a server and a network management tool, wherein the server communicates with a database containing the firmware file, and wherein the network management tool comprises a computer application that communicates with a cloud containing the firmware file.

3. The method of claim 1, wherein the BRFU setup message further contains a file handling instruction, the file handling instruction directing the transmitting device to refrain from broadcasting the copy of the firmware file to the targeted downstream devices while storing the copy of the firmware file in a memory of the transmitting device itself.

4. The method of claim 1, wherein the step of quantifying the number of unsuccessful downstream devices comprises the steps of:
receiving, at the upstream source, a BRFU status message from the at least one transmitting device;
analyzing, at the upstream source, information in the BRFU status message received from the transmitting device.

5. The method of claim 4, wherein the step of receiving, at the upstream source, the BRFU status message from the at least one transmitting device comprises the steps of:
sending a force upload message from the upstream source to the transmitting device; and
waiting for a delay period to receive the BRFU status message in response to the force upload message.

6. The method of claim 4, wherein the BRFU status message contains one or more of a copy of a message requesting the BRFU status message, a session identification, completion status, a number of free blocks of external memory in the targeted downstream device, and a number of times that the same firmware file has been sent or received.

7. The method of claim 6, wherein the completion status comprises a numeric value in a message field indicating whether the targeted downstream device has a good and complete copy of the firmware file in its external memory.

8. The method of claim 1, further comprising the steps of:
analyzing, at the upstream source, the firmware information to determine whether a count of successful downstream devices is less than a count of all targeted downstream devices; and
responsive to a determination that the count of successful downstream devices is less than the count of all targeted downstream devices, repeating the step of sending a broadcast burn command to the at least one transmitting device.

9. The method of claim 1, wherein the sending of the copy of the firmware file to each unsuccessful downstream device commences after a delay following the next wake time specified in the direct setup message.

10. The method of claim 1, wherein the broadcasting of the copy of the firmware file to each unsuccessful downstream device occurs over a non-frequency-hopping channel.

11. The method of claim 1, wherein the sending of the copy of the firmware file to each unsuccessful downstream device comprises directly sending a "store and forward" command over a frequency-hopping channel individually via a hail message to each unsuccessful downstream device.

12. The method of claim 1, wherein the BRFU setup message includes an auto-burn command, and further comprising the step of, responsive to a determination that the predefined limit of BRFUs has been reached, ending the session.

13. The method of claim 1, wherein the BRFU setup message further includes a session identification, the session identification corresponding to a firmware version of the copy of the firmware file.

14. The method of claim 1, further comprising the steps of:
sending a broadcast burn command to the at least one transmitting device;
receiving firmware information from the at least one transmitting device, the firmware information identifying all targeted downstream devices that burned the firmware file into respective memories located in the targeted downstream devices, such downstream devices comprising successful downstream devices, and specifying a version of firmware running on the successful downstream devices;
analyzing the firmware information to determine whether a count of successful downstream devices is less than a count of targeted downstream devices; and
responsive to a determination that the count of successful downstream devices is less than the count of targeted downstream devices, repeating the steps of sending the broadcast burn command and receiving firmware information from the at least one transmitting device until all burns are complete.

15. A method of broadcasting firmware updating messages in a communication system, comprising the steps of:
receiving a broadcast remote firmware update (BRFU) setup message from an upstream source;
broadcasting, by a transmitting device, the BRFU setup message on a first channel to downstream devices targeted by the BRFU setup message, such devices comprising targeted downstream devices, the BRFU setup message specifying at least one other channel to which each targeted downstream device should listen to receive a copy of a firmware file; and
repeatedly broadcasting the firmware file for a predetermined number of times to the targeted downstream devices in accordance with the BRFU setup message, wherein repeated broadcasting of the firmware file for the predetermined number of times comprises one BRFU, and wherein the BRFU setup message further specifies a predefined limit of BRFUs to be executed within a session;
repeating the steps of receiving a BRFU setup message, broadcasting the BRFU setup message, and repeatedly broadcasting the firmware file for the predetermined number of times until the earlier of a determination that a quantified number of unsuccessful targeted downstream devices that did not receive a complete copy of the firmware file falls below a predetermined threshold, and a determination that the predefined limit of BRFUs has been reached; and
responsive to the determination that the predefined limit of BRFUs has been reached,
receiving a broadcast burn command from the upstream source,
responsive to the broadcast burn command, sending a burn command to all targeted downstream devices,
receiving firmware information from each targeted downstream device that successfully burned a copy of the firmware file into an internal memory, each such targeted downstream device comprising a successful downstream device, the firmware information identifying each successful downstream device and specifying a version of firmware running on each successful downstream device, and
sending the firmware information received from each successful downstream device to the upstream source.

16. The method of claim 15, further comprising the step of receiving the firmware file from the upstream source, prior to the step of receiving the BRFU setup message.

17. The method of claim 15, wherein the first channel is a hailing channel, and wherein the at least one other channel is at least one data channel.

18. The method of claim 15, wherein the upstream source is selected from one of a server and a network management tool, wherein the server is located in a host and communicates with a database containing the firmware file, and wherein the network management tool comprises a computer application that communicates with a cloud containing the firmware file.

19. The method of claim 15, wherein the transmitting device is selected from at least one of a hub, a collector, and a repeater.

20. The method of claim 19, wherein the transmitting device comprises a long-range ("LoRa") frequency module (LFM) configured for placement in at least one of the hub and the collector.

21. The method of claim 15, wherein the BRFU setup message additionally specifies a wake time at which each targeted downstream device should wake from a sleeping state.

22. The method of claim 21, wherein a first transmission of the copy of the firmware file in the BRFU commences after a delay following the wake time specified in the BRFU setup message.

23. The method of claim 15, wherein the BRFU setup message further includes a session identification, the session identification corresponding to a firmware version of the copy of the firmware file.

* * * * *